United States Patent [19]
Christopher

[11] 3,770,927
[45] Nov. 6, 1973

[54] PIPE WELDING APPARATUS AND METHODS THEREFOR

[75] Inventor: John Christopher, Redwood City, Calif.

[73] Assignee: Santa Fe International Corporation, Los Angeles, Calif.

[22] Filed: Dec. 14, 1971

[21] Appl. No.: 207,963

Related U.S. Application Data

[62] Division of Ser. No. 108,383, Jan. 21, 1971, Pat. No. 3,697,720.

[52] U.S. Cl.................. 219/8.5, 219/60 A, 219/67, 228/44, 269/48.1
[51] Int. Cl............................................ B23k 13/02
[58] Field of Search............ 219/8.5, 10.41, 59–61, 219/67, 158, 161; 29/464, 493; 228/4, 44; 269/52, 48.1

[56] References Cited
UNITED STATES PATENTS

| | | | |
|---|---|---|---|
| 3,561,320 | 2/1971 | Nelson | 228/44 |
| 2,777,048 | 1/1957 | Kocks | 219/161 |
| 3,007,022 | 10/1961 | Jackson et al. | 219/101 X |
| 3,688,076 | 8/1972 | Hill et al. | 219/60 A |
| 2,413,103 | 12/1946 | Forbes, Jr. | 269/48.1 X |
| 3,633,813 | 12/1971 | Looney et al. | 219/60 A |

Primary Examiner—J. V. Truhe
Assistant Examiner—L. A. Schutzman

[57] ABSTRACT

The pipe welding apparatus includes a longitudinally movable welding station, a longitudinally movable nest housing a traveller including a pipe aligner and expander and a traction assembly. A pair of pipe sections are butted one to the other and the welding station is displaced into alignment with the joint. The nest is moved to an end of a pipe section remote from the joint and the traveller moves from the nest through the pipe section to the joint. The pipe aligner and expander has a plurality of circumferentially arranged shoes which move radially outwardly to enlarge the butting end portions of the pipe sections and to draw the pipe sections axially toward one another when welding. The welding station includes an induction welder. Upon completion of the welding, the traveller returns to the nest.

15 Claims, 16 Drawing Figures

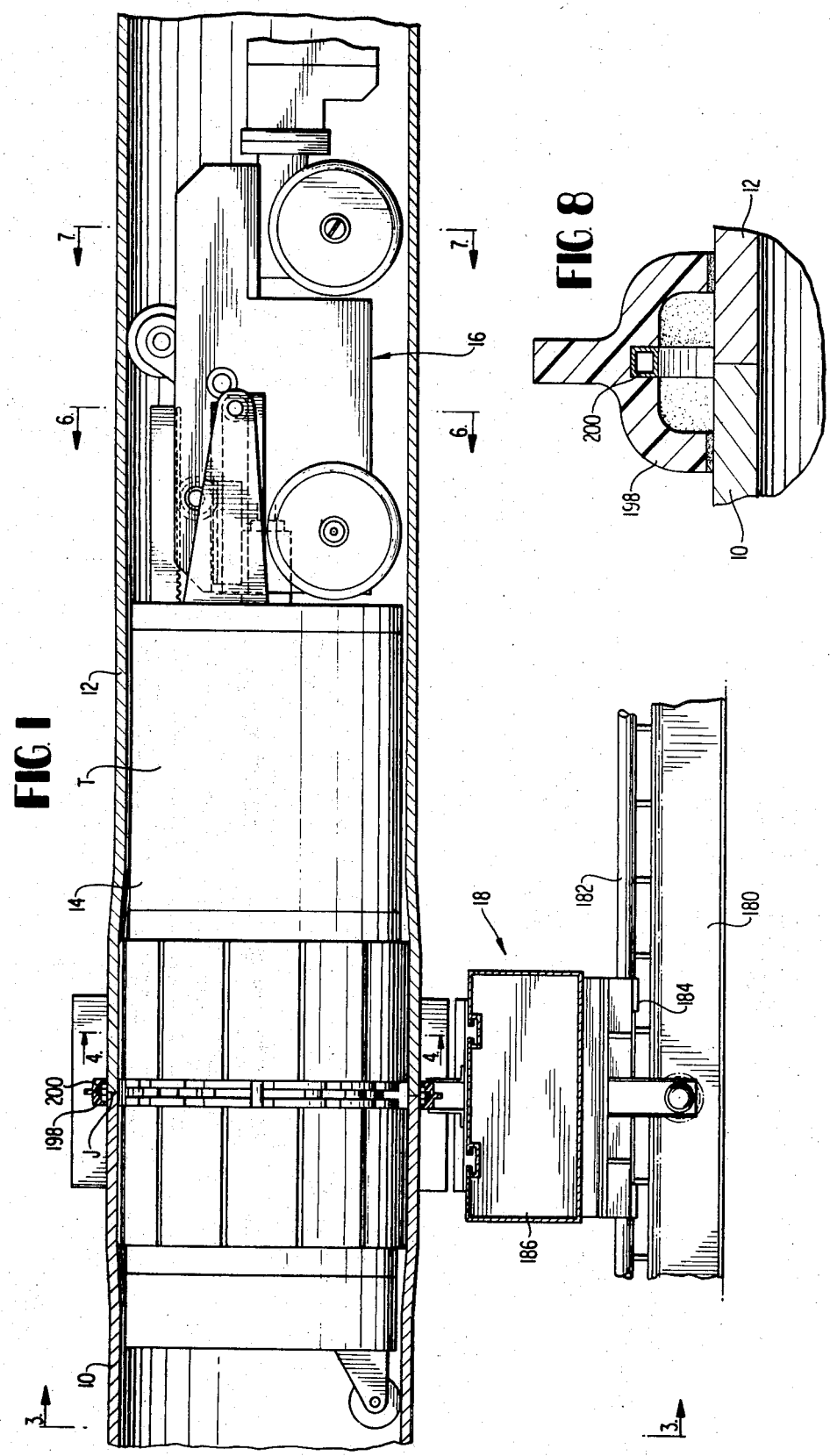

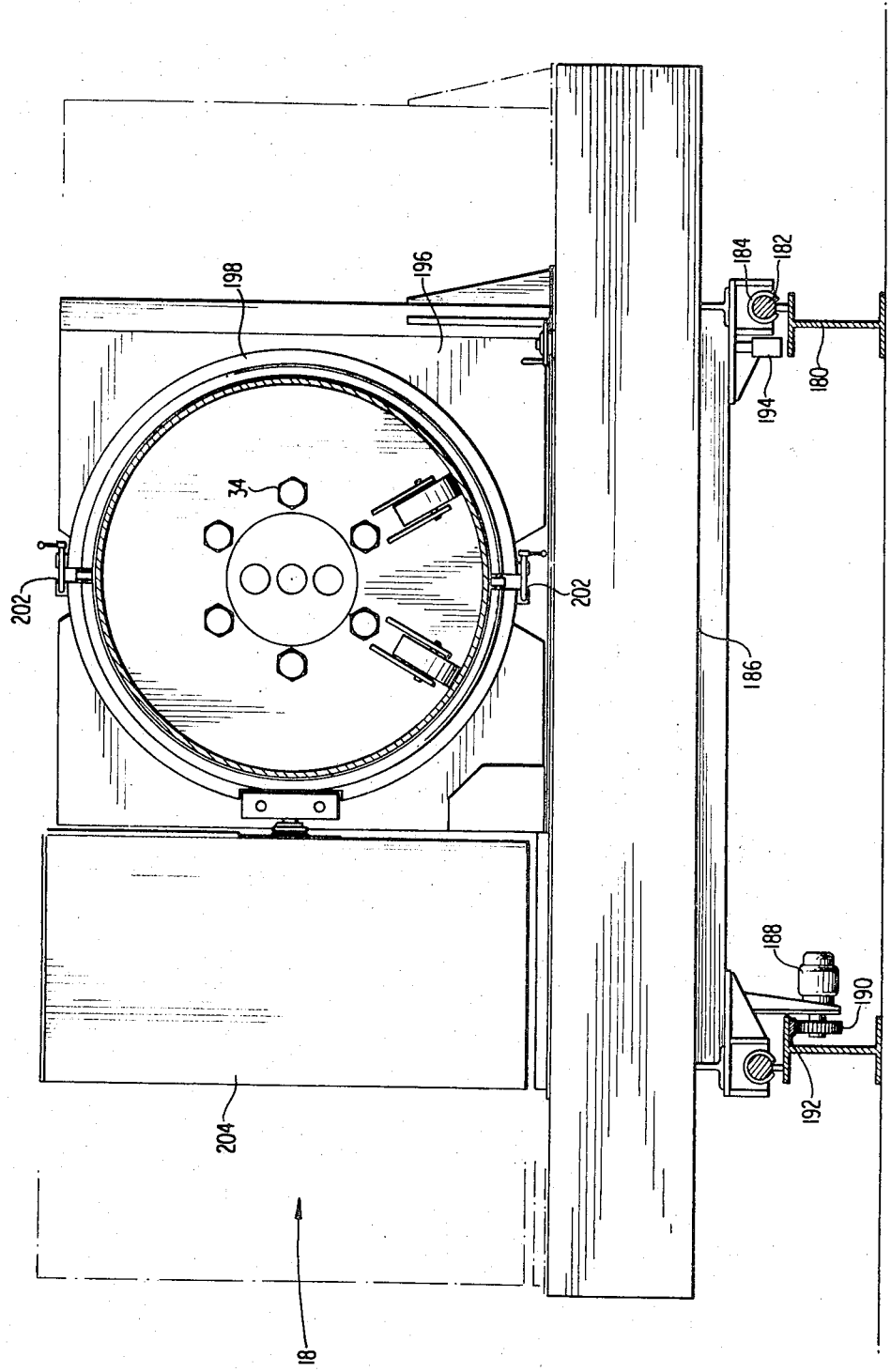

PATENTED NOV 6 1973
3,770,927
SHEET 4 OF 6
FIG. 6
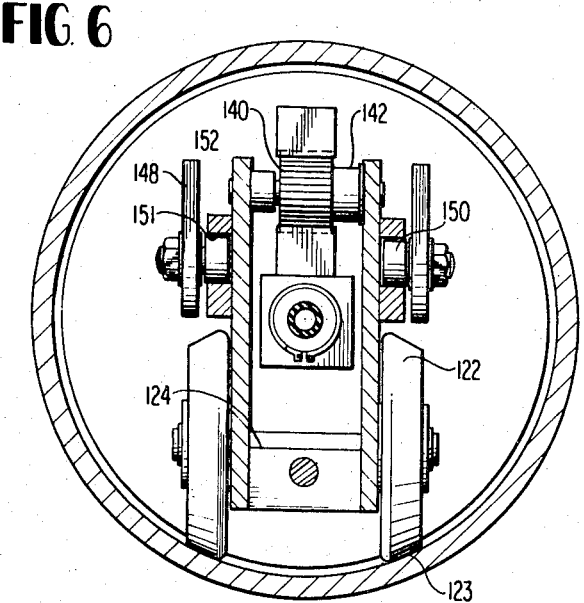
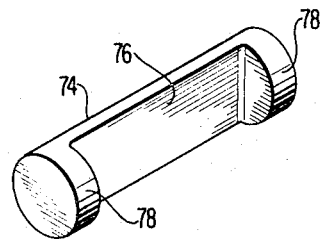
FIG. 9
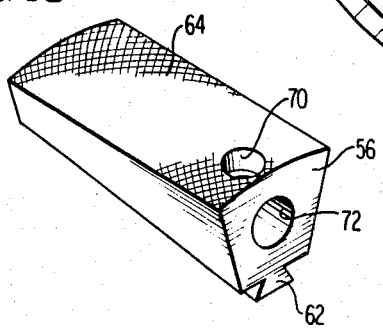
FIG. 10
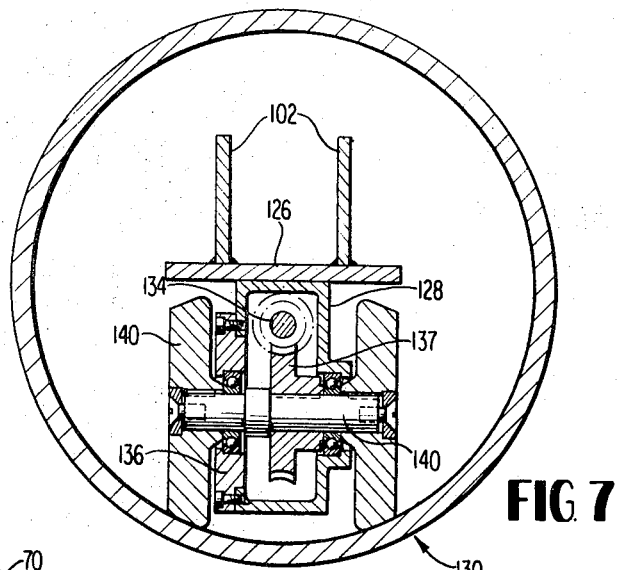
FIG. 7

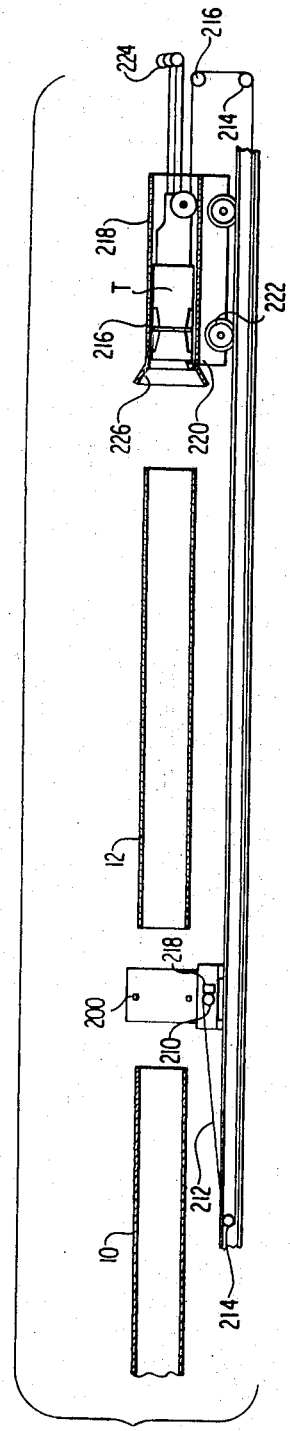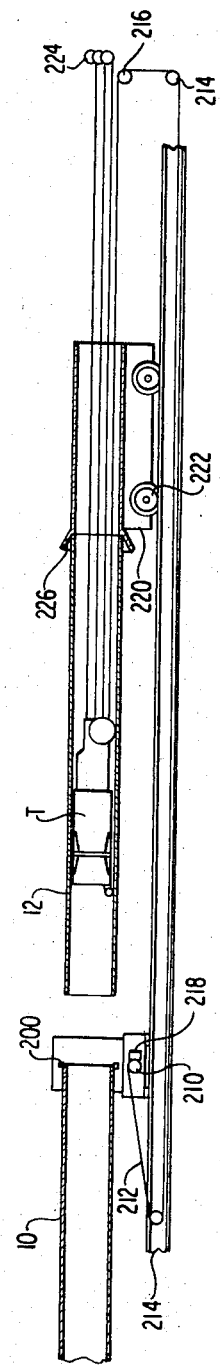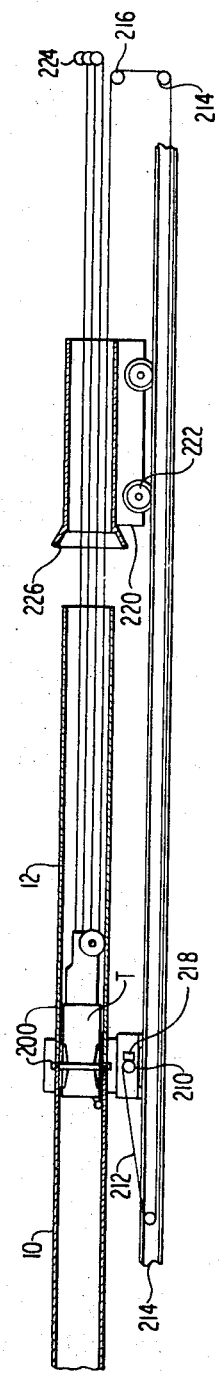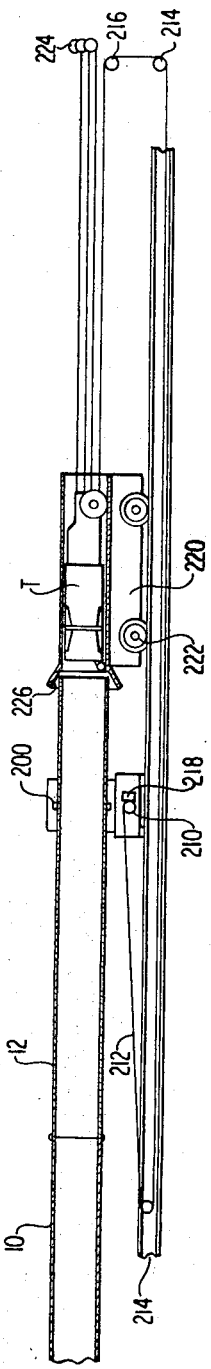

PIPE WELDING APPARATUS AND METHODS THEREFOR

This is a division of application Ser. No. 108,383, filed Jan. 21, 1971, now U.S. Pat. No. 3,697,720, issued Oct. 2, 1972.

The present invention relates to pipe welding apparatus and methods therefor and particularly relates to apparatus and methods for aligning and diametrically enlarging the ends of pipe sections adjacent the joint and butt welding the pipe ends one to the other utilizing induction welding techniques.

Induction welding of the ends of pipe sections one to the other has been accomplished in the past. In many such prior art welding apparatus, the ends of the pipe sections are clamped one to the other and inductively coupled whereby a forge type weld between the pipe sections is effected. In providing the welded joint, prior welding apparatus usually employ pipe aligners which axially align the pipe section ends either externally or internally of the pipe sections depending on the type employed. One such internal pipe aligning apparatus is described and illustrated in U.S. Pat. No. 2,615,413. In that patent, there is disclosed two groups of a plurality of shoes each respectively circumferentially arranged about a cylinder and a piston. Movement of the cylinder with the piston fixed externally moves the shoes associated therewith radially into engagement with the inner wall of one of the pipe sections. Thereafter and after release of the piston, the latter moves relative to the cylinder to move its shoes radially into engagement with the walls of the other pipe section. Thereafter, relative movement of the piston and cylinder circularizes the ends of the pipe sections as well as draws the pipe sections together. It has been found, however, that a cold working of the metal about the pipe ends prior to welding provides a superior welded joint. The device of U.S. Pat. No. 2,615,413 is apparently incapable of uniformly diametrically expanding the ends of the pipe sections to provide a cold working of the metal. Moreover, the shoes of such prior pipe aligning apparatus may become misaligned whereby the shoes are cocked one to the other. When the shoes are cocked, the pipe ends cannot, of course, be circularized. Furthermore, it has in the past been difficult to locate the pipe aligner at the precise location of the joint. That is to say, it has been difficult to locate the aligner as it moves within the pipe section in a manner such that the pipe ends are gripped on opposite sides of the joint a uniform distance from the joint. Still further, sequential engagement of the aligner with the pipe sections, as in U.S. Pat. No. 2,615,413, may cause the aligner to move into misalignment with the joint even when the pipe aligner is initially properly located relative to the joint.

The present invention provides an improved pipe welding apparatus and methods therefor which overcomes the previously noted and other objections and difficulties surrounding prior pipe welding apparatus and methods and provides a novel and improved pipe welding apparatus and methods therefor which eliminates or minimizes the disadvantages associated with the prior pipe welding apparatus and provides various advantages thereover. To this end, the present invention provides a longitudinally movable welding station including an induction coil for surrounding the joint, the coil being diametrically split with the coil halves movable toward and away from one another. The apparatus also includes a nest housing a traveller including a traction assembly for moving the traveller within the pipe sections and a pipe aligner and expander for obtaining coaxial relation of the pipe sections and diametrically enlarging and cold working the metal of the pipe section ends adjacent the joint. Utilizing the pipe welding apparatus and methods hereof, the pipe sections are located in end to end butting relation and the welding station is displaced to locate the induction coil in position surrounding the joint. The nest is moved into alignment with the end of one of the pipe sections remote from the joint and, by actuating the traction assembly, the traveller moves from the nest through the one pipe section toward the joint.

It is a particular feature of the present invention that the pipe aligner and expander hereof can be precisely located with the pipe sections relative to the joint. To accomplish this, there is provided a reel on the movable welding station, the line from which extends about a pair of spaced fixed pulleys and is secured at one end to the traveller assembly. Thus, once the length of the pipe section to be welded is known, the length of line payed out from the reel is determinitive of the location of the traveller within the pipe sections. By constructing the traction assembly to be responsive to a predetermined length of line payed out from the reel to stop the traveller within the pipe section, the traveller can be precisely located within the pipe sections relative to the joint.

Once the pipe aligner and expander is precisely located within the pipe sections, a fluid actuated piston and cylinder arrangement operates to substantially simultaneously engage a plurality of circumferentially spaced shoes against the inner walls of the pipe section ends on either side of the joint to axially align the pipe sections, enlarge the diameter of the pipe sections at the joint to a uniform diameter, cold work the metal of the pipe section ends at the joint by such diametrical enlargement and axially displace the pipe sections toward one another. The pipe aligner and expander per se contains many novel features including apparatus for maintaining the shoes in axial alignment one with the other and maintaining a simultaneous uniform radial movement of the shoes. Also, there is provided an apparatus for preventing cocking of the shoes whereby circularization of the pipe section ends is ensured. It is also a further feature hereof that apparatus is provided for maintaining the pipe aligner and expander in its precisely located position relative to the joint when the piston and cylinder of the pipe aligner and expander move relative to one another to engage the shoes against the inner walls of the pipe sections. To accomplish this, the pipe aligner and expander is mounted for movement relative to the traction assembly whereby relative movement of the piston and cylinder in equal increments in opposite axial directions is assured. That is to say, the location of the traction assembly relative to the joint is maintained at a constant fixed distance when the pipe aligner and expander is actuated and which actuation might otherwise tend to dislocate the pipe aligner and expander relative to the joint.

Accordingly, it is a primary object of the present invention to provide novel and improved pipe welding apparatus and methods therefor.

It is another object of the present invention to provide a novel and improved pipe welding apparatus including a traveller assembly carrying a pipe aligner and expander wherein the traveller assembly can be displaced along the pipe sections and precisely located within the pipe sections relative to the joint.

It is still another object of the present invention to provide an improved pipe welding apparatus including a pipe aligner and expander which serves to diametrically expand and hence cold work the metal of the pipe section ends prior to welding.

It is a further object of the present invention to provide a pipe welding apparatus including a traveller assembly comprised of a pipe aligner and expander and a traction assembly wherein the relative position of the traction assembly and the joint is maintained irrespective of the movements of the various parts of the pipe aligner and expander in engaging, expanding and drawing towards one another end ends of the pipe sections on opposite sides of the joint.

It is a still further object of the present invention to provide novel pipe welding apparatus including a longitudinally movable nest for housing the traveller, and a longitudinally movable welding station.

These and further objects and advantage of the present invention will be more apparent upon reference to the following specification, appended claims and drawings wherein:

FIG. 1 is a fragmentary vertical cross sectional view of a pair of butting pipe sections illustrated in position for welding utilizing a pipe welding apparatus constructed in accordance with the present invention;

FIG. 2(a) and FIG. 2(b) are vertical cross sectional views of the pipe welding apparatus hereof particularly illustrating a pipe aligner and expander in FIG. 2(a) and a traction assembly therefor in FIG. 2(b), FIG. 2(b) forming a continuation of FIG. 2(a) along the dashed line at the right hand end of FIG. 2(a);

FIG. 3 is a transverse sectional view through a pipe section generally taken about on line 3—3 in FIG. 1 and illustrating the pipe welding station and the pipe aligner and expander within the pipe section at the welding station;

Figure 2A:
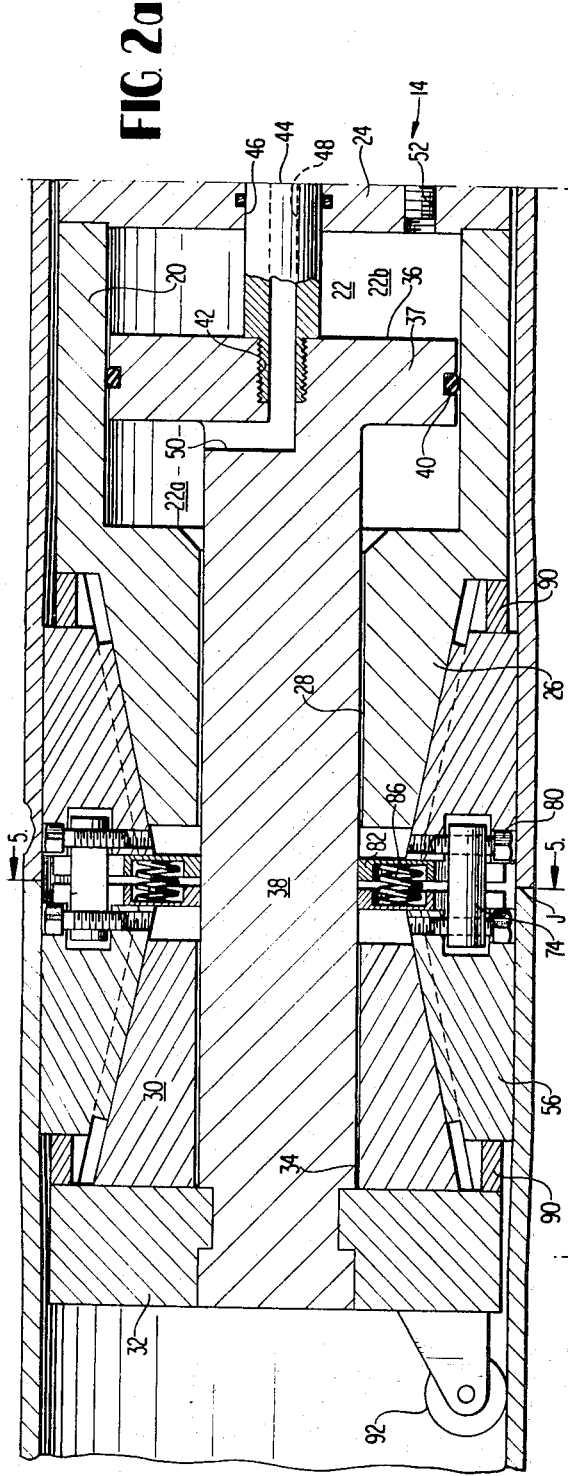
Figure 11:
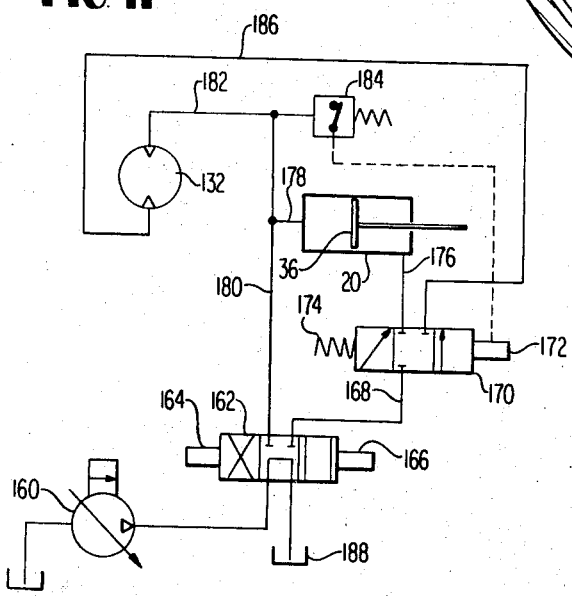

FIGS. 6 and 7 are transverse cross sectional views of the traction assembly and taken generally about on lines 6—6 and 7—7 respectively in FIG. 1;

FIG. 8 is an enlarged fragmentary cross sectional view illustrating a portion of the induction welder and a pipe joint at the pipe welding station;

FIG. 9 is a perspective view of a pin connecting between longitudinally adjacent shoes of the pipe aligner and expander illustrated in FIG. 2(a);

FIG. 10 is a perspective view of a shoe utilized in the pipe aligner and expander illustrated in FIG. 2(a);

FIG. 11 is a schematic diagram of a fluid circuit for the pipe welding apparatus hereof; and FIGS. 12–15 are schematic elevational views with parts in cross section illustrating the manner in which the pipe sections are butt welded one to the other.

Referring now to the drawings, particularly to FIGS. 1 and 12, there is illustrated a pair of pipe sections 10 and 12 in spaced, generally coaxial, alignement, which pipe sections are to be butt welded one to the other utilizing the pipe welding apparatus hereof. The pipe welding apparatus comprises a traveller T for movement within the pipe sections and including a pipe aligner and expander generally indicated 14 and a traction assembly generally indicated 16. The traction assembly 16 is utilized to advance pipe aligner and expander 14 through one of the pipe sections to locate it in a predetermined position relative to the pipe joint J formed at the abutting ends of pipe sections 10 and 12, to maintain the pipe aligner and expander 14 in such predetermined position during welding, and to withdraw or retract the pipe alinger and expander 14 through the pipe after the weld is accomplished. There is also illustrated in FIG. 1 a pipe welding station generally indicated 18 which, in the embodiment herein disclosed, comprises an induction butt welder more particularly described hereinafter.

Referring now in detail to the pipe aligner and expander 14 and particularly to FIGS. 2(a), 4, 5 and 10, there is illustrated a cylinder 20 defining a chamber 22 with an end plate 24 fixed to cylinder 20. The base portion 26 of cylinder 20 comprises a truncated conically shaped element having a central passage 28. Longitudinally adjacent and in axial alignment with cylinder 20 is a similar truncated conically shaped element 30 having an end plate 32 suitably secured thereto by bolts 34 (FIG. 3). Conical element 30 has a central passage 34 in axial alignment with passage 28. A piston 36 is provided and includes a piston head 37 received in chamber 22 and a piston shaft 38 slideably receivable in passages 28 and 34 of conical elements 26 and 30, respectively. The piston shaft 38 is secured at an end remote from head 37 to end plate 32. A suitable 0-ring seal 40 is provided about piston head 37 in chamber 22. Piston 36 is tapped as at 42 and threadedly receives the end nipple of a rod 44, the latter being slideably received through a central opening 46 in end plate 24. Rod 44 has an axial passage 48 which, in conjunction with a passage 50 formed in piston 36, lies in communication with chamber 22(a) on the inner side of piston head 37. A tapped opening 52 is provided in end plate 24 and a suitable fitting 54 (FIG. 2(b)) is provided for communicating pressure fluid to and from chamber 22(b) on the opposite side of piston head 37. It will thus be readily appreciated that cylinder 20 including element 26 and plate 24 is relatively axially movable with respect to piston 36 including element 30 and end plate 32.

Figure 4:
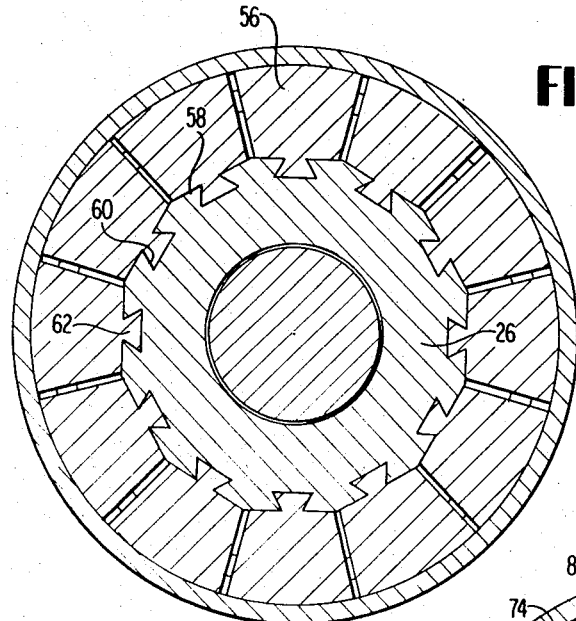
FIG. 4 is a cross sectional view of the pipe aligner and expander generally taken about on line 4—4 in FIG. 1.
Figure 5:
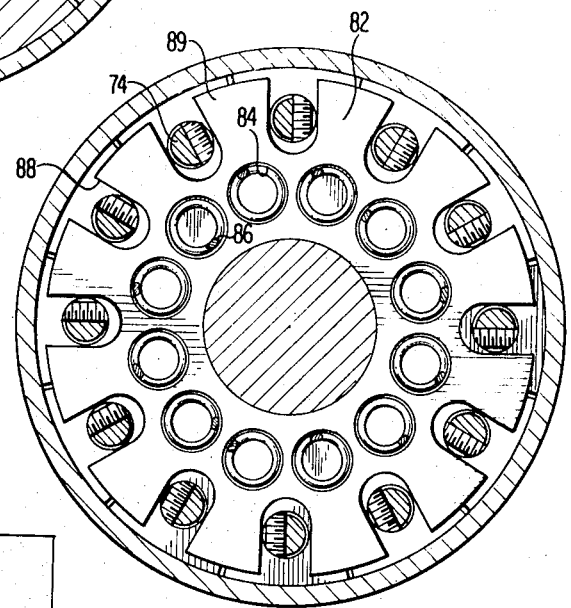
FIG. 5 is a transverse cross sectional view of the pipe aligner and expander taken about on line 5—5 in FIG. 2(a)

As particularly illustrated in FIGS. 2(a) and 4, a like number of a plurality of shoes 56 are circumferentially spaced about the conical surfaces of each of elements 26 and 30. For example, in FIG. 4, there is illustrated twelve shoes disposed about element 26 of cylinder 20 and, accordingly, a like number of shoes 56 are also circumferentially spaced about element 30. The shoes 56 are mounted for axial and radial sliding movement in a manner as will now be described.

The lateral surfaces of conically shaped elements 26 and 30 are identical and a description of one, for example, with respect to the element 26 illustrated in FIG. 4, is believed sufficient as a description of the other. Referring to FIG. 4, conical element 26 has a plurality of flat sides 58 disposed circumferentially thereabout and equal in number to the number of shoes 56 thereabout. A tongue and groove type connection is provided between each of the shoes and its associated underlying flat face 58. Particularly, each face 58 is provided with a groove 60 which extends along and parallel to the surface 58 in an axial direction. A tongue 62 is provided along the underface of each of shoes 56, the tongue 62 extending in an axial direction and having a slope corresponding to the slope of groove 62 whereby the corresponding shoe 56 is axially slideable relative to element 26. It will be appreciated that relative axial movement between shoes 56 and the conical shaped elements 26 and 30 provides for radial expansion and retraction of shoes 56 when the shoes lie in a fixed axial position. As will be appreciated in FIG. 10, the outer faces 64 of shoes 56 are arcuate to conform to the inner surface of the pipe sections in which the particular pipe aligner and expander is to be utilized. By providing a plurality of shoes 56 circumferentially spaced about the pipe aligner and expander and providing a generally arcuate outer surface 64 on the shoes, it will be appreciated that the outer surfaces of the shoes form a substantially uninterrupted sleeve in a diametral plane of the pipe.

The shoes 56 on the respective elements 26 and 30 are mounted for uniform radial expansion and contraction and also provide, in use, a constant gripping force on the ends of the pipe sections substantially uniformly about their inner peripheries. To accomplish these ends, the shoes on the respective elements 26 and 30 are maintained in axial alignment one with the other and are also connected one to the other for relative uniform axial sliding movement. Each shoe is provided adjacent its larger end with a radially extending tapped bore 70 and an axially extending recess 72 opening through the large end face of the shoe and in communication with bore 70. As best illustrated in FIGS. 2(a) and 9, opposite ends of pins 74 are received within the axially aligned openings 72 of each pair of axially aligned shoes 56. Each pin 74 has an elongated cutout 76 along one side thereof with its opposite ends 78 forming radially projecting lugs 78. Bolts 80 are received in passages 70 of the axially aligned shoes 56 and extend within the cutout 76 of pin 74. A pair of alignment discs 82 are provided about piston shaft 38 on the opposed ends of the conical elements. Each alignment disc 82 (FIGS. 2(a) and 5) includes a plurality of circular recesses 84 spaced circumferentially about shaft 38. When discs 82 are in axial and circumferential alignment one with the other, the recesses 84 of the respective discs lie in axial alignment each with the other and receive compression springs 86 for biasing the discs axially away from one another. A plurality of radially extending cutouts are circumferentially spaced about the periphery of each of the alignments discs 82, the cutouts 88 opening outwardly through the outer edges of discs 82. When assembled, pins 74 are disposed within cutouts 88 and the portions 89 of the discs 82 between the cutouts 88 bear against respective end faces of shoes 56. Thus, the axially aligned shoes 56 are biased away from one another and also maintained in predetermined axial and circumferential relation one with the other. By the foregoing described arrangement, coil springs 86 maintain a uniform maximum gap between the shoes when relaxed up to the time shoes 56 grip the interior walls of the pipe sections as described hereinafter. A pair of spacer rings 90 are provided between the reduced ends of shoes 56 and shoulders formed on cylinder 20 and end plate 32 to limit the radial expansion of shoes 56. That is to say, spacer rings 90 determine the maximum final interior diameter of the pipe at the joint. The alignment discs 82 also present cocking of the shoes 56 at different diametrical positions. Also mounted on end plate 32 is a wheel 92 which, in conjunction with traction assembly 16, provides for traversing movement of the traveller T within the pipe sections.

Figure 2B:
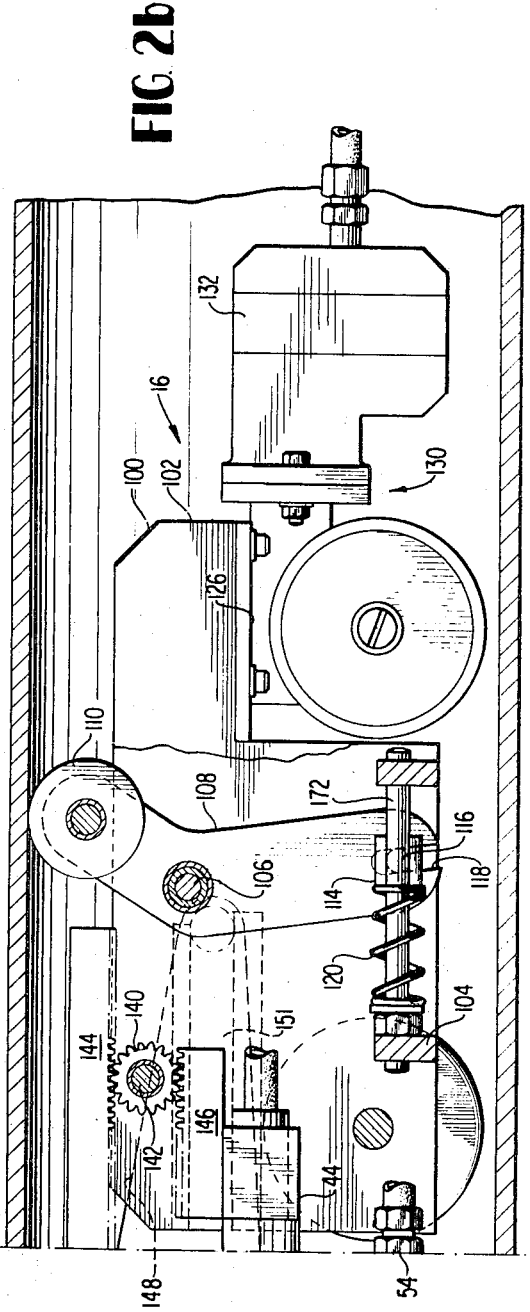

Turning now to FIG. 2(b), there is illustrated, in detail, traction assembly 16 which comprises a frame 100 including a pair of frame plates 102 transversely spaced one from the other by a pair of longitudinally spaced stiffeners 104 and a transversely extending shaft 106. A pair of idler arms 108 are pivotably mounted on shaft 106 and at one end mount an idler wheel 110 for engagement along the upper interior wall of the pipe section in which the pipe aligner and expander 14 is disposed. Along the lower side of frame 100 and between frame plates 102, there is provided a rod 112 extending longitudinally between stiffeners 104. A block 114 is slideably carried by rod 112. Block 114 lies between the lower ends of idler arms 108 and has a pair of laterally extending stub shafts 116 received in substantially vertically extending slots 118 opening through the lower ends of idler arms 108. A compression spring 120 is carried by rod 112 and biases block 114 for sliding movement from left to right as seen in FIG. 2(b) whereby idler arms 108 are biased for counterclockwise rotation with the result that idler wheel 110 is continuously biased against the upper interior wall of the pipe section. As best illustrated in FIG. 6, a forward portion of frame 100 is carried by a pair of wheels 122 suitably mounted on an axle 124 carried by frame plates 102. It will be noted that the edges 123 of wheels 122 are beveled for conformity with the arcuate surface of the pipe section. Also, idler wheel 110 has a convex surface for conformity with the arcuate interior wall of the pipe section.

A motor mounting plate 126 is preferably welded along the underside of frame plates 102 and a drive housing 128 forming a part of drive assembly, generally indicated 130 is suitably secured thereto. Drive assembly 130 includes a reversible fluid actuated motor 132 which drives a worm gear 134 (FIG. 7). Worm gear 134 extends axially within a drive housing 128. Housing 128 in conjunction with a housing cover 136 carries a worm gear 137 splined to an axle 138, worm gear 137 lying in meshing engagement with worm 134. Axle 138 carries a pair of drive wheels 140, the edges of which are beveled to conform to the inner arcuate wall of the pipe section. It will thus be appreciated that actuation of motor 132 in forward or reverse directions drives wheels 140 through the worm and worm gear transmission for driving traveller T in forward and reverse directions through the pipe section.

When the pipe aligner and expander 14 is properly located within the pipe sections adjacent the joint J, it is important to maintain this position for welding particularly when shoes 56 are expanded to engage the inner pipe wall. To prevent axial dislocation of the pipe aligner and expander 14 and traveller assembly 16 in the pipe when the fluid motor comprising piston 36 and cylinder 20 of the expander is actuated in a manner to be described, the distance between traveller frame assembly 100 and the gap between the axially spaced shoes remains constant throughout their radial expansion and axial movement toward one another. To this end, there is provided a pinion 140 carried on a pinion shaft 142 journalled between frame plates 102. A rack 144 is suitably secured to cylinder end plate 24 and lies in meshing engagement with pinion 140 on one side thereof. A tail rod rack 146 is secured to the tail end of rod 44 and lies in meshing engagement with pinion 140 on its other side. A pair of brackets 148 are secured to end plate 24 and project rearwardly on opposite sides of traveller frame 100. Brackets 148 carry rollers 159 which engage in tracks 151 on the outer sides of plates 102, the tracks 151 being formed by vertically spaced bars 152. In this manner, relative movement between traction assembly 16 and pipe aligner and expander 14 is provided. That is to say, when cylinder 20 and its end plate 25 are axially displaced to the left as seen in FIG. 2(a) to radially expand shoes 56, piston 36 is axially displaced to the right an equal distance through the connection between cylinder 20 and piston 36 comprising racks 144 and 146 and pinion 140. Thus, cylinder 20 may be displaced axially toward and away from frame assembly 100 with rollers 150 travelling in tracks 151 of frame assembly 100. In this manner, when the shoes 56 are located in position on opposite sides of the joint, axial movement of the cylinder 20 and piston 36 is in equal increments in opposite directions whereby shoes 56 are maintained in the selected axial position relative to the joint.

To power the carriage through the pipe sections as well as to expand and retract shoes 56 into and out of engagement with the inner walls of the pipe sections, there is provided a hydraulic circuit best illustrated in FIG. 11. In FIG. 11, there is provided a pressure compensated variable volume pump 160 in communication on one side with a hydraulic fluid reservoir and on its other side with a four-way three position spring centered solenoid actuated valve 162. Solenoids 164 and 166 are provided on either side of valve 162 and, when actuated, shift the valve in directions opposite from the side on which the solenoids are illustrated. A fluid line 168 connects between valve 162 and a two-way two position valve 170 which is actuated for movement to the left as seen in FIG. 11 by a solenoid 172 and which has a spring return 174. A fluid outlet line 176 communicates between valve 170 and one side of piston 36 in cylinder 20, and an exhaust line 178 communicates between the opposite side of piston 36 in cylinder 20 and a fluid line 180. One end of line 180 communicates with valve 162 and its other end communicates with a fluid line 182. Fluid line 182 communicates with reversible hydraulic motor 132 and also with a pressure actuated switch 184. Switch 184 is electrically connected to solenoid 172 as indicated by the dashed line in FIG. 11. The outlet side of motor 132 communicates via hydraulic line 186 with valve 170.

The operation of the hydraulic circuit will now be described. To move pipe traveller T through a pipe section to a location adjacent joint J, solenoid 164 is actuated to shift valve 162 to provide pressure fluid from pump 160 through fluid lines 168 and 186 to drive motor 132 in a forward direction with the pressure fluid returning via fluid lines 182 and 180 through valve 162 to reservoir 188. As will be described hereinafter, a limit switch, actuatable in response to locating pipe aligner and expander 14 within the pipe sections adjacent the pipe joint, de-energizes solenoid 164 whereby valve 162 is returned to its spring centered position preventing further operation of motor 132. In the case of overshoot solenoid 166 is energized by the same limit switch, reversing motor 132, and thus returning traveller to correct alignment when both solenoid 166 and 164 are de-energized. To relatively displace the piston and cylinder and thereby expand the shoes radially, solenoid 164 is again actuated to shift valve 170 to the left as seen in FIG. 11 to provide pressure fluid from pump 160 through fluid lines 168 and 176 into chamber 22(b). After welding is completed, solenoid 164 is de-energized and solenoid 166 is energized to shift valve 162 to the left as seen in FIG. 11 to provide pressure fluid from pump 160 through fluid lines 180 to motor 132 and pressure switch 184. With valve 170 shifted to the left as seen in FIG. 11, the return line 186 from motor 132 is blocked by valve 170 which remains shifted to the left whereby motor 132 cannot be operated. By shifting valve 162 to the left, pressure fluid is supplied chamber 22(a) via fluid lines 180 and 178 and fluid in chamber 22(b) is returned to reservoir 188 via lines 176 and 168. After suitable time delay, pressure build-up in fluid lines 180 and 182 actuates pressure actuated switch 184, which, in turn, de-energizes solenoid 172 whereby valve 170 is spring biased to the right to provide communication between fluid line 186 and reservoir 188 via fluid line 168. Pressure fluid supplied to motor 132 via lines 180 and 182 thus operates motor 132 in the reverse direction whereby the traveller T is withdrawn from the pipe section.

Referring now to FIG. 3, there is illustrated, in detail, the welding station 18 comprising a support structure including a pair of longitudinally extending beams 180 supporting tracks 182. A pair of bushings 184 are mounted on opposite sides and on the underside of a box framed carriage 186, bushings 184 engaging tracks 182 for sliding movement of carriage 186 therealong. The carriage 186 carries a depending fluid motor 188 mounting a pinion 190 which engages a rack 192 disposed along the underside of the upper flange of a beam 180 whereby carriage 186 may be longitudinally displaced along tracks 182 to selected positions by operation of motor 188. A brake 194 is provided on the underside of carriage 186. Carriage 186 includes a pair of upstanding supports 196 which, in turn, carry semi-circular inductor shields 198 and inductors 200 enclosed with inductor shield 198. Suitable clamping devices 202 clamp the semi-circular inductor shields 198 one to the other and provide electrical connections at diametrically opposite positions for the semi-circular inductor coils within the inductor shield. Thus, inductor coils 200 are arranged substantially circularly about a pipe section received between the supports 196. Cooling water circuits, not shown, are provided each semi-circular coil 200 for flow of cooling water therethrough. A suitable housing 204 on one side of welding station 18 contains a transformer and suitable controls for operating the induction wleding apparatus. The supports 196 are slideably mounted on inductor carriage 186 for transverse movement toward and away from one another whereby inductor coil 200 can be disposed about the joint. Also, the transverse sliding movement permits movement of the welded pipe through the welding station without interference from the welding apparatus. The inductor shield 198 is best illustrated in FIG. 8 and comprises a Fiberglass ring for spacing inductor coil 200 equidistant from the pipe joing for all circumferential positions thereabout. To weld the joint and in a preferred form hereof, a 3000-cycle alternating current is provided through the inductor coil and induces a current in the pipe at the joint. The $I^2R$ losses liberate heat which is conducted through to the inner surfaces of the pipe whereby the joint is forge welded.

Referring now to FIGS. 12–15, there is mounted a cable reel 210 on carriage 186 carrying a cable 212. Cable 212 extends from reel 210 and is wrapped about a apir of pulleys 214 longitudinally spaced one from the other a distance at least as great as the sum of the maximum length of a pipe section to be welded, the maximum distance of longitudinal travel of the welder, and a distance equal in length to nest 216. Cable 212 also extends about a fixed elevated pulley 215 whereby the cable obtains an elevation locating it for dispostion in the pipe sections. The end of the cable is suitably secured to the frame assembly 100. A limit switch 218 is carried on carriage 186 and is actuated in response to the paying out of a predetermined length of cable 212 for reasons described hereinafter.

Traveller T is carried in a nest 216 comprising an elongated tubular section 218 mounted on platform 220. Platform 220 has pairs of wheels 222 engaging along tracks 182 and it will be appreciated that nest 216 and the traveller T therein are mounted for longitudinal movement along tracks 182. The hydraulic lines for traveller T are carried about take-up reels schematically illustrated at 224 whereby such lines are maintained in a substantially taut condition for all longitudinal dispositions of traveller T within pipe sections 10 and 12. The forward end of nest 216 is flared outwardly as at 226 for receiving the rearmost end of pipe section 12.

When it is desired to weld the forward end of pipe section 12 to the rear end of pipe section 10, pipe section 12 is located in a line-up station as indicated in FIG. 12 between the inductor welder 18 and nest 216. Nest 216 is then advanced such that the rear end portion of pipe section 12 is received within the flared end 226 of nest 216. Also, by operation of suitable controls for motor 188, the inductor welder 18 is longitudinally displaced along tracks 182 to align inductor 200 with the rear end of pipe section 10, as particularly illustrated in FIG. 13. Simultaneously, the pipe section 12 and nest 216 are longitudinally displaced toward pipe section 10 by suitable means, not shown. Also, solenoid 164 is energized to shift valve 162 to the right as seen in FIG. 11 to provide pressure fluid to motor 132 whereby traveller T advances from nest 216 into pipe section 12 and therealong toward joint J at the opposite end of pipe section 12. It will be appreciated that a predetermined length of cable 212 extends from cable reel 210 to traveller T when the shoes 56 are aligned on either side of pipe joint J for any longitudinal displacement of welder 18. That is to say, once the location of reels 214 and 216 are fixed, limit switch 218 is actuated by the unreeling of a predetermined length of cable 212. Actuation of limit switch 218 de-energizes solenoid 164 whereupon valve 162 returns to its center position stopping flow of pressure fluid to motor 132. With the fluid supply to motor 132 thus stopped, it acts as a brake locating the aligner and expander 14 in the predetermined position with axially spaced shoes 56 on either side of the butt joint J. Should the expander 14 overshoot the joint J, the motor 132 will reverse and the traveller T will hunt for the proper position relative to joint J. It will be appreciated that pipe aligner and expander 14 is thus located with respect to the butt joint for any longitudinal disposition of welder 18 and location of joint J within the range of longitudinal movement of the welder. Once positioned, an operator, through suitable controls not shown, actuates the pipe aligner and expander 14 and welding apparatus to follow a programmed sequence as follows. Solenoids 164 and 172 are energized to shift valve 162 to the right and valve 170 to the left respectively in FIG. 11 to supply pressure fluid to cylinder 20 via fluid lines 168 and 176. As noted previously, relative movement between piston 36 and cylinder 20 occurs through the rack and pinion transmission resulting in equal axial displacement of the conical elements 26 and 30 toward one another and consequent radial outward movement of shoes 56 to engage the inner walls of the pipe sections 10 and 12 on opposite sides of joint J. Further radial movement of shoes 56 causes the end portions of pipe sections 10 and 12 to enlarge diametrically whereby roundness and accurate axial alignment of the pipe sections is assured. The diametrical enlargement also cold works the metal pipe joint and produces an upset for forming the weld joint. Furthermore, axial movement of the conical elements toward one another is transmitted to the pipe sections through shoes 56. The ends of the pipe sections are thus urged toward and engage one another under pressure. Electrical current is then provided through the inductor to preheat pipe sections at their joint to a temperature approximating 600°F., the temperature being maintained for approximately two minutes. Thereafter, the inductor is supplied with full current to obtain a welding temperature of approximately 2,300°F. in the ends of the pipe and this temperature is maintained for a period of slightly less than two minutes. The pipe sections are displaced toward one another under axial pressure when the welding temperature is obtained and the sections are actually shortened in length when welded. After the welded joint is formed, the programmed sequence provides for energization of solenoid 166 to shift valve 162 to the left as seen in FIG. 11 to provide pressure fluid to motor 132 and pressure switch 184 while solenoid 172 remains energized to vent pressure fluid in chamber 22(b) to reservoir 188. Upon reaching a predetermined pressure in fluid line 182, pressure switch 184 is actuated to de-energize solenoid 172 whereby valve 170 shifts to the right to provide a return fluid circuit to reservoir 188 via fluid lines 186 and 168. Motor 132 then operates in a reverse direction retracting traveller T along pipe section 12 and into nest 216. The welded pipe is then moved away from the welding station or the latter is moved away from the former. The operation may then be repeated for additional pipe sections.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of butt welding the ends of a pair of pipe sections one to the other utilizing an induction welder and a traveller including a pipe aligner and expander and a traction assembly comprising:

locating the pipe sections in substantial longitudinal alignment one with the other and with their near ends adjacent one another;

actuating the traction assembly to move the traveller within one of the pipe sections to locate the pipe aligner and expander at the joint between the pipe sections;

actuating the pipe aligner and expander to uniformly circumferentially enlarge adjacent end portions of the pipe sections thereby to accurately axially align the pipe ends one with the other and to provide an axial force to at least one of the pipe sections to urge said one end thereof toward the end of the other pipe section;

actuating said induction welder to weld the ends of the pipe sections one to the other;

deactuating the pipe aligner and expander to release the welded pipe sections;

and actuating the traction assembly to move the traveller along one of the pipe sections in a direction away from the welded joint.

2. The method of claim 1 including displacing the induction welder longitudinally in a direction generally parallel to the longitudinal axes of the pipe sections to locate the welder relative to the joint between the pipe sections.

3. The method according to claim 1 including the step of locating a nest housing the pipe aligner and expander adjacent the end of said one pipe section remote from the end thereof to be welded and actuating the traction assembly to transfer the traveller from said nest to said one pipe section.

4. The method of claim 2 including the step of controlling the movement of the pipe aligner and expander through the one pipe section in accordance with the length of the one pipe section and the longitudinal position of the welder to locate the expander at the butt weld.

5. The method of claim 1 including flowing cooling fluid through the induction welder.

6. A method of butt welding the ends of a pair of pipe sections one to the other utilizing an induction welder and a traveller including a pipe aligner and expander and a traction assembly comprising the steps of; locating the pipe sections in substantial longitudinal alignment one with the other with their near ends forming a pipe joint; actuating said traction assembly to move said traveller longitudinally along a pipe section, sensing a selected axial position of the traveller along the pipe section, providing a signal in response to attainment of said selected position by said traveler, deactuating said traction assembly in response to said signal to locate said pipe aligner and expander at the joint between the pipe sections, actuating said pipe aligner and expander to engage said pipe sections ends and thereby accurately longitudinally aligning said pipe sections one with the other, and actuating said induction welder to weld said pipe ends one to the other.

7. The method of claim 6 including the steps of providing a reference position relative to the pipe joint, providing a line coupling said reference position and said traveller, paying out said line as said traveller moves along the pipe section, and sensing a predetermined payed out length of said line when the pipe aligner and expander is located at the joint to deactivate said traction assembly.

8. The method of claim 6 including the step of locating a nest housing said traveller adjacent the end of one pipe section remote from the end thereof at the joint, and activating the traction assembly to transfer the traveller from the nest to the one pipe section.

9. The method of claim 6 wherein the pipe aligner and expander includes two sets of axially spaced shoes disposable on opposite sides of the pipe joint, each set including a plurality of circumferentially spaced shoes, and including the step of simultaneously moving the sets of shoes radially outwardly for respective engagement with the inner walls of the pipe sections.

10. The method of claim 6 including the step of uniformly circumferentially enlarging said pipe section ends to provide like circularity.

11. The method of claim 1 including the step of sensing a selected axial position of the traveller along the pipe section, providing a signal in response to attainment of said selected position by said traveller, and deactuating said traction assembly in response to said signal to locate said pipe aligner and expander at the joint between the pipe sections.

12. The method of claim 1 including the steps of providing a reference position relative to the pipe joint, providing a line coupling said reference position and said traveller, paying out said line as said traveller moves along the pipe section, and sensing a predetermined payed out length of said line when the pipe aligner and expander is located at the joint to deactivate said traction assembly.

13. The method of claim 1 including the step of locating a nest housing said traveller adjacent the end of one pipe section remote from the end thereof at the joint, and activating the traction assembly to transfer the traveller from the nest to the one pipe section.

14. The method of claim 1 wherein the pipe aligner and expander includes two sets of axially spaced shoes disposable on opposite sides of the pipe joint, each set including a plurality of circumferentially spaced shoes, and including the step of simultaneously moving the sets of shoes radially outwardly for engagement with the inner walls of the pipe sections.

15. The method of claim 14 including the step of preventing relative axial displacement of the sets of shoes when said sets of shoes are simultaneously moved for engagement with the inner walls of the pipe sections.

* * * * *

UNITED STATES PATENT OFFICE
CERTIFICATE OF CORRECTION

Patent No. 3,770,927      Dated November 6, 1973

Inventor(s)    John Christopher

It is certified that error appears in the above-identified patent and that said Letters Patent are hereby corrected as shown below:

Column 7, line 11, "plate 25" should read --plate 24--.

Signed and sealed this 9th day of April 1974.

(SEAL)
Attest:

EDWARD M. FLETCHER, JR.
Attesting Officer

C. MARSHALL DANN
Commissioner of Patents